United States Patent
Zobel et al.

(10) Patent No.: US 6,906,122 B1
(45) Date of Patent: *Jun. 14, 2005

(54) FLAME-RESISTANT POLYCARBONATE BLENDS

(75) Inventors: Michael Zobel, Köln (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 386 days.

This patent is subject to a terminal disclaimer.

(21) Appl. No.: 10/069,716

(22) PCT Filed: Aug. 22, 2000

(86) PCT No.: PCT/EP00/08169

§ 371 (c)(1),
(2), (4) Date: Feb. 27, 2002

(87) PCT Pub. No.: WO01/18120

PCT Pub. Date: Mar. 15, 2001

(30) Foreign Application Priority Data

Sep. 2, 1999 (DE) .......................... 199 41 822

(51) Int. Cl.[7] .................. C08K 5/5317; C08K 3/10; C08K 3/22; C08K 3/34; C08L 5/04
(52) U.S. Cl. .................. 524/119; 524/117; 524/124; 524/128; 524/463; 524/504; 523/201
(58) Field of Search .............................. 524/117, 119, 524/128, 463, 504, 124; 523/201

(56) References Cited

U.S. PATENT DOCUMENTS

| 3,505,431 A | 4/1970 | Birum ........................ 260/932 |
| 3,711,577 A | 1/1973 | Maier ........................ 260/932 |
| 4,054,544 A | 10/1977 | Albright ................. 260/2.5 AJ |
| 4,073,767 A | 2/1978 | Birum .................. 260/45.8 R |
| 4,397,750 A | 8/1983 | Chibnik ................. 252/51.5 A |
| 4,937,285 A * | 6/1990 | Wittmann et al. ............ 525/67 |
| 5,061,745 A | 10/1991 | Wittmann et al. .......... 524/139 |
| 5,204,394 A | 4/1993 | Gosen et al. .............. 524/125 |
| 5,276,066 A | 1/1994 | Paulik et al. ............... 521/108 |
| 5,552,465 A * | 9/1996 | Witmann et al. ........... 524/139 |
| 5,672,645 A | 9/1997 | Eckel et al. ................. 524/127 |
| 5,844,028 A | 12/1998 | Paulik ........................ 524/117 |
| RE36,902 E | 10/2000 | Eckel et al. ................ 524/217 |

FOREIGN PATENT DOCUMENTS

| CA | 2318430 | 7/1999 |
| DE | 197 34 661 A1 * | 8/1997 |
| EP | 0 315 868 | 5/1989 |
| EP | 0 482 451 | 4/1992 |
| FR | 1371139 | 8/1964 |
| GB | 2 330 583 | 4/1999 |

* cited by examiner

Primary Examiner—Tae H. Yoon
(74) Attorney, Agent, or Firm—Joseph C. Gil; Aron Preis

(57) ABSTRACT

The present invention provides thermoplastic polycarbonate blends which contain phosphonate amines and special graft polymers, which are prepared using redox initiator systems, and which are characterised by improved mechanical properties such as notched impact resistance, weld line strength and stress crack resistance.

21 Claims, No Drawings

FLAME-RESISTANT POLYCARBONATE BLENDS

The present invention provides thermoplastic polycarbonate blends which contain phosphonate amines and special graft polymers, which are prepared using redox initiator systems, and which are characterised by very good mechanical properties.

U.S. Pat. No. 4,073,767 and U.S. Pat. No. 5,844,028 describe cyclic phosphorus compounds including phosphorinane rings as suitable flame retardants for polyurethanes, polycarbonates, polyesters and polyamides. In U.S. Pat. No. 4,397,750, specific cyclic phosphonate esters are described as efficient flame retardants for polypropylene and other polyolefins. U.S. Pat. No. 5,276,066 and U.S. Pat. No. 5,844,028 describe specific (1,3,2-dioxaphospborinanemethane) amines which are suitable flame retardants for polyurethanes, polyesters, styrene polymers, PVC, PVAc or polycarbonate.

U.S. Pat. No. 3,505,431, FR-P 1 371 139, U.S. Pat. No. 3,711,577, U.S. Pat. No. 4,054,544 describe acyclic triphosphonate amines, some of which are halogenated.

EP-A 0 640 655 describes moulding compositions made from aromatic polycarbonate, styrene-containing copolymers and graft polymers which can be made flame resistant with monomeric and/or oligomeric phosphorus compounds.

EP-A 0 363 608 describes flame resistant polymer mixtures made from aromatic polycarbonate, styrene-containing copolymers or graft copolymers and also oligomeric phosphates as a flame resistant additive. For many applications such as, for example, in the internal sections of housings, the heat resistance of these mixtures is often inadequate U.S. Pat. No. 5,061,745 describes polymer mixtures made from aromatic polycarbonate, ABS graft polymers and/or styrene-containing copolymers and with monophosphates as flame retardant additives. For the production of thin-walled housing parts, the level of stress cracking resistance of these mixtures is often inadequate.

The object of the present invention is therefore the preparation of PC/ABS moulding compositions which are characterised by a combination of good impact resistance, weld line strength and stress cracking resistance and also have a high heat resistance. This range of properties is demanded in particular for applications in the data processing sector such as, for example, for thin-walled housings for monitors, printers, etc.

Surprisingly, it has now been found that, by using phosphonate amines according to the invention and graft polymers which are prepared by means of a redox initiator system, flame resistant polycarbonate blends are obtained which provide moulded articles with a combination of good impact resistance, weld line strength and stress crack resistance and also have a high heat resistance.

The invention therefore provides blends containing
A) 40 to 99, preferably 60 to 98.5 parts by wt. of an aromatic polycarbonate and/or polyestercarbonate
B) 0.5 to 60, preferably 1 to 40, in particular 2 to 25 parts by wt. of a graft polymer, characterised in that the graft polymers B consist of
B.1) 5 to 95, preferably 30 to 80 wt. % of one or more vinyl monomers and
B.2) 95 to 5, preferably 20 to 70 wt. % of one or more particulate diene rubbers with a glass transition temperature of <10° C., preferably <0° C., in particular <−20° C., which are prepared by emulsion polymerisation, wherein an initiator system consisting of an organic hydroperoxide and ascorbic acid is used,
C) 0 to 45, preferably 0 to 30, in particular 2 to 25 parts by wt. of at least one thermoplastic polymer, selected from the group consisting of thermoplastic vinyl (co)polymers and polyalkylene terephthalates,
D) 0.1 to 30 parts by wt., preferably 1 to 25 parts by wt., in particular 2 to 20 parts by wt. of phosphonate amine of the formula (I)

$$A_{3-y}\text{-N}\text{---}B_y \quad (I),$$

in which
A represents a group of the formula (IIa)

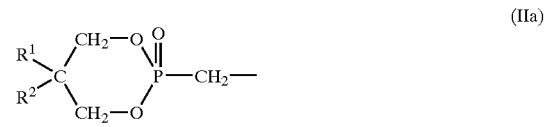

(IIa)

or (IIb)

(IIb)

$R^1$ and $R^2$, independently, represent an unsubstituted or substituted $C_1$–$C_{10}$ alkyl group or an unsubstituted or substituted $C_6$–$C_{10}$ aryl group, $R^3$ and $R^4$, independently, represent an unsubstituted or substituted $C_1$–$C_{10}$ alkyl group or an unsubstituted or substituted $C_6$–$C_{10}$ aryl group or $R^3$ and $R^4$ together represent an unsubstituted or substituted $C_3$–$C_{10}$ alkylene group, y has the numerical value 0, 1 or 2 and B independently, represents hydrogen, an optionally halogenated $C_2$–$C_8$, alkyl group, or an unsubstituted or substituted $C_6$–$C_{10}$ aryl group.

E) 0 to 5 parts by wt., preferably 0.1 to 3 parts by wt., in particular 0.1 to 1, quite specifically 0.1 to 0.5 parts by wt. of a fluorinated polyolefin.

Component A

Aromatic polycarbonates and/or aromatic polyestercarbonates suitable for use according to the invention in accordance with component A are known from the literature or can be prepared by methods known from the literature (to prepare aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; to prepare aromatic polyestercaribonates see, for example, DE-OS 3 077 934).

Polycarbonates are prepared, for example, by reacting diphenols with carbonic acid halides, preferably phosgene and/or with aromatic dicarboxylic acid dihalides, preferably benzenedicarboxylic acid dihalides, by the phase interface method, optionally using chain stoppers, for example monophenols, and optionally using trifinctional or more than trifunctional branching agents, for example triphenols or tetraphenols.

Diphenols for preparing aromatic polycarbonates and/or aromatic polyestercarbonates are preferably those of the formula (II)

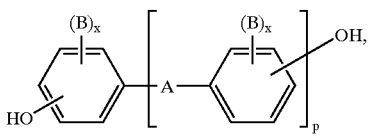
(II)

wherein

A represents a single bond, a $C_1$–$C_5$ alkylene, $C_2$–$C_5$ alkylidene, $C_5$–$C_6$ cycloalkylidene, —O—, —SO—, —CO—, —S—, —SO$_2$, or $C_6$–$C_{12}$ arylene group, to which further aromatic rings, optionally containing heteroatoms, may be condensed,
or a group of the formula (III) or (IV)

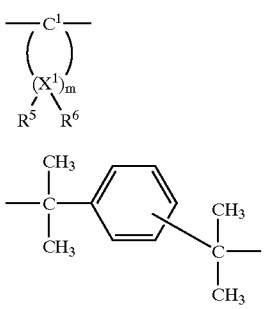

(III)

(IV)

B each represent a $C_1$–$C_{12}$ alkyl group, preferably methyl or a halogen, preferably chlorine and/or bromine, x each represent, independently, 0, 1 or 2, p is 1 or 0 and $R^5$ and $R^6$ can be selected independently for each $X^1$ and represent, independently, hydrogen or a $C_1$–$C_6$ alkyl group, preferably hydrogen, methlyl or ethyl, $X^1$ represents carbon and m is an integer from 4 to 7, preferably 4 or 5, with the proviso that $R^5$ and $R^6$ are simultaneously alkyl groups on at least one $X^1$ atom.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-hydroxyphenyl)-sulfoxides, bis-(hydroxyphenyl)-ketones, bis-(hydroxyphenyl)-sulfones and α,α-bis-(hydroxyphenyl)-diisopropyl-benzenes and their ring-brominated and/or ring-chlorinated derivatives.

Particularly preferred diphenols are 4,4'-dihydroxydiphenyl, bisphenol-A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and their di- and tetrabrominated or chlorinated derivatives such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol-A) is particularly preferred.

The diphenols may be used individually or as any mixture thereof.

The diphenols are known from the literature or are obtainable by methods known from the literature.

Chain stoppers which are suitable for preparing thermoplastic, aromatic polycarbonates are, for example, phenol, p-chlorophenol, p-tert.-butylphenol or 2,4,6-tribromophenol, but also long-chain alkylphenols such as 4-(1,3-tetramethylbutyl)-phenol in accordance with DE-OS 2 842 005 or monoalkylphenols or dialkylphenols with a total of 8 to 20 carbon atoms in the alkyl substituents, such as 3,5di-tert.-butylphenol, p-iso-octylphenol, p-tert.-octylphenol, p-dodecylphenol and 2-(3,5-dimethylheptyl)-phenol and 4-(3,5-dimethylheptyl)-phenol. The amount of chain stoppers to be used is in general between 0.5 mol. % and 10 mol. %, with respect to the molar sum of each of the diphenols used.

The thermoplastic, aromatic polycarbonates have mean weight-average molecular weights ($M_W$, measured, for example, by ultracentrifuge or light scattering measurements) of 10 000 to 200 000, preferably 20 000 to 80 000.

The thermoplastic, aromatic polycarbonates may be branched in a known manner, in fact preferably by incorporating 0.05 to 2.0 mol. %, with respect to the sum of the diphenols used, of trifunctional or more than trifunctional compounds, for example those with three or more phenolic groups.

Both homopolycarbonates and also copolycarbonates are suitable. To prepare copolycarbonates in accordance with component A according to the invention, 1 to 25 wt. %, preferably 2.5 to 25 wt. % (with respect to the total amount of diphenols used) of polydiorganosiloxanes with hydroxyaryloxy terminal groups may also be used. These are known (see, for example, U.S. Pat. No. 3,419,634) or can be prepared by methods known from the literature. The preparation of polydiorganosiloxane-containing copolycarbonates is described, for example, in DE-OS 3 334 782.

Preferred polycarbonates, in addition to bisphenol-A homopolycarbonates, are the copolycarbonates of bisphenol-A with up to 15 mol. %, with respect to the molar sum of diphenols, other than the diphenols mentioned as preferred or particularly preferred, in particular 2,2-bis-(3,5-dibromo-4-hydroxyphenyl)-propane.

Aromatic dicarboxylic acid dihalides for preparing aromatic polyestercarbonates are preferably the diacid dichlorides of isophthalic acid, terephthalic acid, diphenylether-4,4'-dicarboxylic acid and naphthalene-2,6-dicarboxylic acid.

Mixtures of the diacid dichlorides of isophthalic acid and terephthalic acid in a ratio between 1:20 and 20:1 are particularly preferred.

When preparing polyestercarbonates, a carbonic acid halide, preferably phosgene, is also used as a bifunctional acid derivative.

Suitable chain stoppers for use when preparing aromatic polyestercarbonates are, in addition to the monophenols mentioned above, their chlorocarbonates and also the acid chlorides of aromatic monocarboxylic acids, which may optionally be substituted by $C_1$–$C_{12}$ alkyl groups or by halogen atoms, and also $C_2$–$C_{22}$ monocarboxylic acid chlorides.

The amount of each chain stopper is 0.1 to 10 mol. %, with respect, in the case of phenolic chain stoppers, to the moles of diphenols and, in the case of monocarboxylic acid chloride chain stoppers, to moles of dicarboxylic acid dichlorides.

The aromatic polyestercarbonates may also contain copolymerised aromatic hydroxycarboxylic acids.

The aromatic polyestercarbonates may be either linear or branched in a known manner (with reference to this point, see also DE-OS 2 940 024 and DE-OS 3 007 934).

Branching agents which may be used are, for example trifunctional or more than trifunctional carboxylic acid chlorides such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol. % (with respect to the dicarboxylic acid dichlorides used) or trifunctional or more than trifunctional phenols such as phloroglucinol, 4,6-dimethyl-2,4,6-tri-(4-hydroxyphenyl)-hept-2-ene, 4,4-dimethyl-2,4,6-tri-(4-hydroxyphenyl)-heptane, 1,3,5-tri-4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-4-[4-hydroxyphenylisopropyl]-phenoxy)-methane, 1,4-bis-[4,4'-dihydroxytriphenyl)-methyl]-benzene, in amounts of 0.01 to 1.0 mol. %, with respect to the diphenols used. Phenolic branching agents may be initially introduced with the diphenols, acid chloride branching agents may be introduced together with the acid dichlorides.

In the thermoplastic, aromatic polyestercarbonates, the proportion of carbonate structural units may be any value at all. The proportion of carbonate groups is preferably up to 100 mol. %, in particular up to 80 mol. %, especially up to 50 mol. %, with respect to the sum of ester groups and carbonate groups. Both the ester fraction and the carbonate fraction of the aromatic polyestercarbonates may be present in the form of blocks or may be distributed statistically within the polycondensate.

The relative viscosity ($\eta_{rel}$) of the aromatic polycarbonates and polyester carbonates is in the range 1.18 to 1.4, preferably 1.22 to 1.3 (measured using solutions of 0.5 g of polycarbonate or polyestercarbonate in 100 ml of methylene chloride solution at 25° C.).

The thermoplastic, aromatic polycarbonates and polyestercarbonates may be used separately or as any mixture with each other.

Component B

Component B contains one or more graft polymers of

B.1 5 to 95, preferably 30 to 80 wt. %, of at least one vinyl monomer on

B.2 95 to 5, preferably 70 to 20 wt. % of one or more particulate diene rubbers with glass transition temperatures <10° C., preferably <0° C., in particular <−10° C., which are prepared by emulsion polymerisation using an initiator system consisting of an organic hydroperoxide and ascorbic acid.

Graft substrate B.2 generally has an average particle size ($d_{50}$ value) of 0.05 to 5 μm, preferably 0.10 to 0.6 μm, in particular 0.20 to 0.40 μm.

Monomers B.1 are preferably mixtures of

B.1.1 50 to 99 parts by wt. of vinyl aromatic compounds and/or ring-substituted vinyl aromatic compounds (such as, for example, styrene, α-methylstyrene, p-methylstyrene, p-chlorostyrene) and/or ($C_1$–$C_8$) alkyl methacrylates (such as e.g. methyl methacrylate, ethyl methacrylate) and B.1.2 1 to 50 parts by wt. of vinyl cyanides (unsaturated nitriles such as acrylonitrile and methacrylonitrile) and/or ($C_1$–$C_8$) alkyl (meth)acrylates (such as e.g. methyl methacrylate, n-butyl acrylate, t-butyl acrylate) and/or derivatives (such as anhydrides and imides) of unsaturated carboxylic acids (for example maleic anhydride and N-phenyl-maleic imide).

Preferred monomers B.1.1 are selected from at least one of the monomers styrene, α-methylstyrene and methyl methacrylate, preferred monomers B.1.2 are selected from at least one of the monomers acrylonitrile, maleic anhydride and methyl methacrylate.

Particularly preferred monomers are B.1.1 styrene and B.1.2 acrylonitrile.

Preferred graft substrates B.2 are diene rubbers (e.g. based on butadiene, isoprene, etc.) or mixtures of diene rubbers or copolymers of diene rubbers or their mixtures with further copolymerisable monomers (e.g. in accordance with B.1.1 and B1.2) with the proviso that the glass transition temperature of component B.2 is <10° C., preferably <0° C., particularly preferably <−10° C. and in particular <−20° C.

Pure polybutadiene rubber is particularly preferred.

Graft polymers with the following constituents are particularly preferred a) 40 to 90 wt. % of particulate diene rubber with an average particle diameter of 0.1 to 0.6 μm and b) 60 to 10 wt. % of styrene, acrylonitrile, methyl methacrylate or mixtures of these, produced by emulsion graft polymerisation, which are characterised in that an initiator system consisting of an organic hydroperoxide and ascorbic acid is used for graft polymerisation, with the production of a graft yield of >60 wt. %, preferably >75 wt. %, in particular >85 wt. % (with respect to the monomers B.1 or b used).

According to one embodiment, graft polymerisation of monomers a) is performed in aqueous emulsion in the presence of an emulsion of rubber polymer b) at temperatures of 40 to 70° C., in particular 50 to 70° C., using an initiator system consisting of organic hydroperoxide (I) and ascorbic acid (II), wherein 0.3 to 1.5 parts by wt. of (I) and 0.1 to 1 part by wt. of (II), each with respect to 100 parts by wt. of graft polymer, are generally used and the ratio by weight (I):(II) is 0.3 to 15, in particular 1 to 10, preferably 3 to 8 (see DE-A-37 08 913 (=U.S. Pat. No. 4,859,744) and EP-A-315 868 (=U.S. Pat. No. 4,937,285)).

The rubbers are generally partly cross-linked and have gel contents of 10 to 90 wt. %, in particular of 40 to 80 wt. % and are particulate with average particle sizes ($d_{50}$, value) of 0.1 to 0.6 μm, in particular 0.2 to 0.4 μm. These types of particulate rubbers are known. They are prepared by emulsion polymerisation and are generally available as latices.

The graft polymers are prepared in aqueous emulsion by polymerising the monomers on a rubber present in aqueous emulsion. Surface-active auxiliary agents are generally used; emulsifiers or dispersants and also optionally additives in order to adjust the pH and electrolyte contents to specific values during graft polymerisation. In some circumstances, emulsion graft polymerisation may also be performed without the addition of an emulsifier, in particular when small amounts of monomers are used, with respect to the amount of rubber, or when the amounts of emulsifier already present in the rubber emulsion (latex) itself are sufficient to ensure graft polymerisation of the monomers in the emulsified state with adequate emulsion stability.

Anionic emulsifiers are particularly suitable, preferably alkali metal salts of fatty acids, resin acids, disproportionated resin acids, alkylsulfonic acids, arylsulfoninc acids. They are used in amounts of up to 5 wt. %, preferably up to 2.5 wt. %, with respect to the monomers being polymerised.

Suitable hydroperoxides are, for example, cumyl hydoperoxide, tert.-butyl hydroperoxide, hydrogen peroxide, preferably cumyl hydroperoxide and tert.-butyl hydroperoxide, that is hydroperoxides with long half life periods.

An aqueous emulsion of a partially cross-linked diene rubber is grafted batchwise or continuously in aqueous emulsion; at polymerisation temperatures of 40 to 70° C., in particular 50 to 70° C., the graft monomers and optionally additional emulsifier and hydroperoxide and ascorbic acid solutions are added to the rubber emulsion. The ratios by weight mentioned above should be observed during this procedure. In exceptional cases, catalytically small amounts of heavy metal cations, in particular Fe, may be added as a further component of the starter system for polymerisation, especially when diene rubber emulsions have to be used which themselves already contain large amounts of complexing agents. Normally, no iron ions are added in the process; this method is preferred and enables the recovery of industrially advantageous graft polymers which contain virtually no heavy metals, or only very small amounts, since it is known that traces of such metals can have a deleterious effect on the application-oriented properties of plastics. The process is performed using aqueous solutions of ascorbic acid and aqueous solutions of hydroperoxide. It is advantageous to feed insufficiently water-soluble hydroperoxides, such as cumyl hydroperoxide, to the polymerisation system in the form of an aqueous emulsion. The same emulsifier is advantageously used in these emulsions as is used for graft polymerisation.

The hydroperoxide and ascorbic acid may be added to the graft polymerisation system in portions or continuously. In a preferred variant, the hydroperoxide is initially introduced into the reactor proportionately with the rubber to be grafted; the graft monomers and the remaining ascorbic acid, hydroperoxide and optionally emulsifier are fed separately into the reactor as polymerisation of the graft monomers proceeds.

The amounts of hydroperoxide and ascorbic acid are critical. If too much hydroperoxide and/or ascorbic acid are added, the graft polymerisation process is impaired. The graft yield is reduced; the molecular weight of the grafted and free resin is lower. Undershooting or exceeding the amounts of hydroperoxide and ascorbic acid can also have a sensitive effect on monomer conversion and the stability of the emulsion, so that industrial achievement of the graft polymerisation process becomes impossible. In order to perform the process and to optimise the structure of the graft polymer and its physical properties, it is essential to maintain a temperature of 40 to 70° C. and to observe the amounts of hydroperoxide/ascorbic acid mentioned above.

In the case of graft polymerisation up to monomer conversions of greater than 90 wt. %, in particular greater than 98 wt. %, storage-stable graft polymer emulsions with polymer concentrations of 25 to 50 wt. % are produced. The graft polymer itself can readily be isolated from the emulsions by known methods of coagulation (e.g. using acids or salts). If the graft polymer is to be combined with thermoplastic resins, which are themselves present as an emulsion, then the graft polymer emulsion can be mixed with the resin emulsion and the mixture can be coagulated as one.

The gel content of graft substrate B.2 is determined at 25° C. in a suitable solvent (M. Hoffman, H. Krömer, R. Kuhn, Polymeranalytik I and II, Georg Thieme-Verlag, Stuttgart, 1977).

The average particle size $d_{50}$ is the diameter, above and below which 50 wt. % of the diameters of the particles are found. It can be determined by means of ultracentrifuge measurements (W. Scholtan, H. Lange, Kolloid, Z. und Z. Polymere 250 (1972), 782–796).

Component C

Component C contains one or more thermoplastic vinyl (co)polymers C.1 and/or polyalkylene terephthalates C.2.

(Co)polymers which are suitable for use as C.1 are polymers of at least one monomer from the group of vinyl aromatic compounds, vinyl cyanides (unsaturated nitriles), ($C_1$–$C_8$) alkyl (meth)acrylates, unsaturated carboxylic acids and derivatives (such as anhydrides and imides) of unsaturated carboxylic acids. Particularly suitable (co)polymers are those made from C.1.1 50 to 99, preferably 60 to 80 parts by wt. of vinyl aromatic compounds and/or ring-substituted vinyl aromatic compounds (such as, for example, styrene, α-methylstyrene, p-methylstyrene, p-chlorostyrene) and/or ($C_1$–$C_4$) alkyl (meth)acrylates (such as e.g. methyl methacrylate, ethyl methacrylate), and C.1.2 1 to 50, preferably 20 to 40 parts by wt. of vinyl cyanides (unsaturated nitriles) such as acrylonitrile and methacrylonitrile and/or ($C_1$–$C_8$) alkyl (meth)acrylates (such as e.g. methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenyl-maleic imide).

(Co)polymers C.1 are resinous, thermoplastic and rubber-free.

The copolymer is particularly preferably composed of C.1.1 styrene and C.1.2 acrylonitrile.

(Co)polymers in accordance with C.1 are known and can be prepared by radical polymerisation, in particular by emulsion, suspension, solution or bulk polymerisation. (Co)polymers in accordance with component C.1 preferably have molecular weights $M_W$ (weight average, determined by light scattering or sedimentation) between 15 000 and 200 000.

The polyalkylene terephthalates in component C.2 are reaction products of aromatic dicarboxylic acids or their reactive derivatives, such as dimethyl esters or anhydrides, and aliphatic, cycloaliphatic or araliphatic diols and also mixtures of these reaction products.

Preferred polyalkylene terephthalates contain at least 80 wt. %, preferably at least 90 wt. %, with respect to the dicarboxylic acid component, of terephthalic acid groups and at least 80 wt. %, preferably at least 90 wt. %, with respect to the diol component, of ethylene glycol and/or butanediol-1,4 groups.

Preferred polyalkylene terephthalates may contain, in addition to terephthalates, up to 20mol. %, preferably up to 10 mol. % of groups from other aromatic or cycloaliphatic dicarboxylic acids with 8 to 14 carbon atoms or aliphatic dicarboxylic acids with 4 to 12 carbon atoms, such as e.g. groups from phthalic acid, isophthalic acid, naphthalene-2, 6dicarboxylic acid, 4,4'-diphenyldicarboxylic acid, succinic acid, adipic acid, sebacic acid, azelaic acid, cyclohexanediacetic acid.

Preferred polyalkylene terephthalates may contain, in addition to ethylene glycol or butanediol-1,4 groups, up to 20 mol. %, preferably up to 10 mol. %, of other aliphatic diols with 3 to 12 carbon atoms or cycloaliphatic diols with 6 to 21 carbon atoms, e.g. groups from propanediol-1,3, 2-ethylpropanediol-1,3, neopentyl glycol, pentanediol-1,5, hexanediol-1,6, cyclohexane-dimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane (DE-OS 2 407 674, 2 407 776, 2 715 932).

The polyalkylene terephthalates may be branched by incorporating relatively small amounts of trihydric or tetrahydric alcohols or tribasic or tetrabasic carboxylic acids, e.g. in accordance with DE-OS 1 900 270 and U.S. Pat. No. 3,692,744. Examples of preferred branching agents are trimesic acid, trimellitic acid, trimethylolethane and -propane and pentaerythritol.

Particularly preferred polyalkylene terephthalates are those which have been prepared solely from terephthalic acid and its reactive derivatives (e.g. its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

Preferably used polyalkylene terephthalates generally have an intrinsic viscosity of 0.4 to 1.5 dl/g, preferably 0.5 to 1.2 dl/g, measured in phenol/o-dichlorobenzene (1:1 by weight) at 25° C. in an Ubbelohde viscometer.

Polyalkylene terephthalates can be prepared by known methods (see e.g. Kunststoff-Handbuch, vol. VIII, p. 695 et seq., Carl-Hanser-Verlag, Munich 1973).

Component D

Moulding compositions according to the invention contain, as a flame retardant, at least one phosphonate amine compound of the formula (I)

   (I), in which

A represents

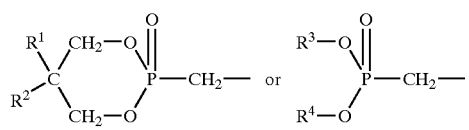

wherein $R^1$, $R^2$, $R^3$ and $R^4$ and also B and y are defined in the same way as given above.

B preferably represents, independently, hydrogen, ethyl, n-propyl or iso-propyl, which may be substituted by halogen, or a $C_6$–$C_{10}$ aryl group which is unsubstituted or substituted by a $C_1$–$C_4$ alkyl group and/or by halogen, in particular phenyl or naphthyl.

Alkyl in $R^1$, $R^2$, $R^3$ and $R^4$ preferably represents, independently, methyl, ethyl, n-propyl, iso-propyl, n-, iso-, sec. or tert.-butyl, pentyl or hexyl.

Substituted alkyl in $R^1$, $R^2$, $R^3$ and $R^4$ preferably represents, independently, a $C_1$–$C_{10}$ alkyl group substituted by halogen, in particular for mono- or di-substituted methyl, ethyl, n-propyl, iso-propyl, n-, iso-, sec. or tert.-butyl, pentyl or hexyl.

$R^3$ and $R^4$, together with the carbon atom to which they are bonded, preferably form cyclopentyl, cyclohexyl, cycloheptyl or cyclooctyl, in particular cyclopentyl or cyclohexyl.

$C_6$–$C_{10}$ aryl in $R^1$, $R^2$, $R^3$ and $R^4$, independently, preferably represents phenyl, naphthyl or binaphthyl, in particular o-phenyl, o-naphthyl, o-binaphthyl, which may be substituted by halogen (in general once, twice or three times).

The following are mentioned by way of example and for preference: 5,5,5',5',5",5"-hexamethyl-tris-(1,3,2-dioxaphosphorinane-methane)-amino-2,2',2"-trioxide of the formula (I-1)

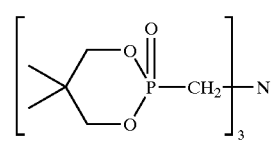

(trial product XPM 1000, from Solutia Inc., St. Louis, USA) 1,3,2-dioxaphosphorinane-2-methanamine, N-butyl-N[(5,5dimethyl-1,3,2-dioxaphosphorinan-2-yl)-methyl]-5,5-dimethyl-, P,2dioxide; 1,3,2-dioxaphosphorinane-2-methanamine, N-[(5,5-dimethyl-1,3,2-dioxaphosphorinan-2-yl)-methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanamine, N-[(5,5-dimethyl-1,3,2-dioxaphosphorinan-2-yl)-methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)-methyl]-5,5-dichloromethyl-, P,2-dioxide, 1,3,2-dioxa-phosphorinane-2-methanamine, N-[(5,5-di-chloromethyl-1,3,2-dioxaphosphorinan-2-yl)-methyl]-5,5-di-chloromethyl-N-phenyl-, P,2-dioxide; 1,3,2-dioxaphorinane-2-methanamine, N,N-di-(4-chlorobutyl)-5,5-dimethyl-2-oxide; 1,3,2-dioxaphosphorinane-2-methanamine, N-[(5,5dimethyl-1,3,2-dioxaphosphorinan-2-yl)-methane]-N-(2-chloroethyl)-5,5di-(chloromethyl)-, P2-dioxide.

Also preferred are:

compounds of the formula (I-2) or (I-3)

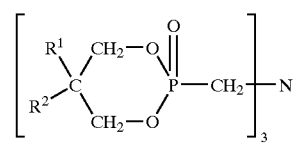

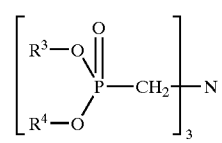

wherein $R^1$, $R^2$, $R^3$ and $R^4$ are defined in the same way as above.

Compounds of the formula (I-2) and (I-1) are particularly preferred. The individual compounds mentioned above are also particularly preferred.

Compounds of the formula (I) can be prepared by the following process:

a) $PCl_3$ is added to a mixture of 1,3-diol derivatives, water and an organic solvent at a temperature of 10–60° C. A 5,5-disubstituted 1,3,2-dioxaphosphorinane-2-oxide of the formula (Ia) is obtained

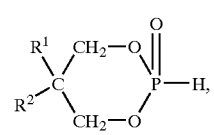

wherein $R^1$ and $R^2$ are defined in the same way as above, b) after purification, the 1,3,2-dioxaphosphorinane-2-oxide is reacted, in paraformaldehyde, with an amine $B_yNH_{3-y}$, wherein B and y are defined in the same way as above, c) after purifying again and drying, the phosphonate amine of the formula (I) is obtained.

A detailed description of the method of preparation can be found in U.S. Pat. No. 5,844,028.

Component E

Fluorinated polyolefins E have high molecular weights and have glass transition temperatures higher than −30° C., generally higher than 100° C., and fluorine contents of preferably 65 to 76, in particular 70 to 76 wt. %, average particle diameters $d_{50}$ of 0.05 to 1 000, preferably 0.08 to 20 μm. Fluorinated polyolefins E generally have a density of 1.2 to 2.3 g/cm³. Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (see "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, vol. 13, 1970, pages 623–654; "Modern Plastics Encyclopedia", 1970–1971, vol. 47, no. 10 A, October 1970, McGraw-Hill, Inc., New York, pages 134 and 774; "Modern Plastics Encyclopedia", 1975–1976, October 1975, vol. 52, no. 10 A, McGraw-Hill, Inc., New York, pages 27, 28 and 472 and U.S. Pat. Nos. 3,671,487, 3,723,373 and 3,838,092).

They can be prepared by known processes, that is, for example, by polymerising tetrafluoroethylene in aqueous medium with a free radical-producing catalyst, for example sodium, potassium or ammonium peroxydisulfate, at pressures of 7 to 71 kg/cm² and at temperatures of 0 to 200° C., preferably at temperatures of 20 to 100° C. (For more details, see e.g. U.S. Pat. No. 2,393,967). Depending on the initial form, the density of these materials is between 1.2 and 2.3 g/cm³ and the average particle size is between 0.5 and 1 000 μm.

According to the invention, preferred fluorinated polyolefins E are tetrafluoroethylene polymers with average particle diameters of 0.05 to 20 μm, preferably 0.08 to 10 μm, and a density of 1.2 to 1.9 g/cm³ and are preferably used in the form of a coagulated mixture of emulsions of tetrafluoroethylene polymer E and emulsions of the graft polymers B.

Further preparations which are preferred according to the invention are fluorinated polyolefins E:

E.1) as a coagulated mixture with at least one of components A to C, wherein the fluorinated polymer B or polyolefin mixture as an emulsion is mixed with at least one emulsion of the components A to C and is then coagulated or E.2) as a pre-compound with at least one of components A to C, wherein the fluorinated polyolefin E as a powder is mixed with a powder or granules of at least one of the components A to C and is compounded in the molten state, in general at temperatures of 208° C. to 330° C. in conventional equipment such as internal compounders, extruders or twin-shaft screws.

Preferred preparations of fluorinated polyolefin E are coagulated mixtures with a graft polymer B or a vinyl (co)polymer C.

Fluorinated polyolefins E which are suitable for use in powdered form are tetrafluoroethylene polymers with average diameters of 100 to 1 000 μm and densities of 2.0 g/cm³ to 2.3 g/cm³.

To prepare a coagulated mixture of B and E, an aqueous emulsion (latex) of a graft polymer B is first mixed with a finely divided emulsion of a tetrafluoroethylene polymer E; suitable tetrafluoroethylene polymer emulsions normally have solids contents of 30 to 70 wt. %, preferably 50 to 60 wt. %, in particular 30 to 35 wt. %.

The ratio by weight of graft polymer B or (co)polymer to fluorinated polyolefin E in the emulsion mixture is 95:5 to 60:40, preferably 90:10 to 50:50. Then, the emulsion mixture is coagulated in a known manner, for example by spray-drying, freeze-drying or coagulation by means of adding inorganic or organic salts, acids, bases or water-miscible organic solvents such as alcohols or ketones, preferably at temperatures of 20 to 150° C., in particular 50 to 100° C. If required, the mixture may be dried at 50 to 200° C., preferably 70 to 100° C.

Suitable tetrafluoroethylene polymer emulsions are commercially available products and are sold, for example, by DuPont as Teflon® 30 N.

Moulding compositions according to the invention may contain at least one of the conventional additives such as lubricants and mould-release agents, nucleating agents, anti-static agents, stabilisers or colorants and pigments.

Moulding compositions according to the invention may contain up to 35 wt. %, with respect to the entire moulding composition, of a further, optionally synergistic, flame retardant. Examples of further flame retardants which may be mentioned are organic halogenated compounds such as decabromobisphenyl ether, tetrabromobisphenol, inorganic halogen compounds such as ammonium bromide, nitrogen compounds such as melamine, melamineformaldehyde resins, inorganic hydroxide compounds such as Mg or Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, talc, silicones, silicon dioxide and tin oxide and also siloxane compounds.

Furthermore, phosphorus compounds of the formula (VI) are suitable as flame retardants,

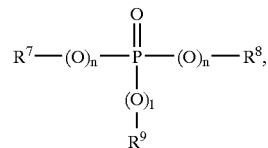

(VI)

in which $R^7$, $R^8$ and $R^9$, independently, represent an optionally halogenated $C_1$–$C_8$ alkyl or and optionally halogenated and/or alkylated $C_5$ or $C_6$ cycloalky or an optionally halogenated and/or alkylated and/or aralkylated $C_6$–$C_{30}$ aryl group and "n" and "l", independently, are 0 or 1.

These phosphorus compounds are generally known (see for example, Ullmann, Enzyklopädie der technischen Chemie, vol. 18, pages 301 et seq., 1979 and EP-A 345 522). Aralkylated phosphorus compounds are described, for example, in DE-OS 38 24 356.

Optionally halogenated $C_1$–$C_8$ alkyl groups in accordance with (VI) may contain one or more halogen atoms and be linear or branched. Examples of alkyl groups are chloroethyl, 2-chloropropyl, 2,3-dibromopropyl, butyl, methyl or octyl.

Optionally halogenated and/or alkylated $C_5$ or $C_6$ cycloalkyl groups in accordance with (VI) are optionally singly or multiply halogenated and/or alkylated $C_5$ or $C_6$ cycloalkyl groups, that is e.g. cyclopentyl, cyclohexyl, 3,3,5-trimethylcyclohexyl and fully chlorinated cyclohexyl.

Optionally halogenated and/or alkylated and/or aralkylated $C_6$–$C_{30}$ aryl groups in accordance with (VI) are optionally mononuclear or polynuclear, singly or multiply halogenated and/or alkylated and/or aralkylated groups, e.g. chlorophenyl, bromophenyl, pentachlorophenyl, pentabromophenyl, phenyl, cresyl, isopropylphenyl, benzyl-substituted phenyl and naphthyl.

$R^7$, $R_8$ and $R^9$ preferably represent, independently, methyl, ethyl, butyl, octyl, phenyl, cresyl, cumyl or naphthyl. $R^7$, $R^8$ and $R^9$, independently, represent in particular methyl, ethyl or butyl or phenyl which is optionally substituted by methyl and/or ethyl.

Phosphorus compounds in accordance with formula (VI) which may be used according to the invention are e.g. tributyl phosphate, tris-2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, tris-(p-benzylphenyl) phosphate, triphenylphosphine oxide, dimethyl methanephosphonate, diphenyl methanephosphonate and diethyl phenylphosphonate.

Suitable flame retardants are also dimeric and oligomeric phosphates such as are described, for example, in EP-A-0 363 608.

Moulding compositions according to the invention may also contain phosphorus compounds in accordance with formula (VII) as flame retardants

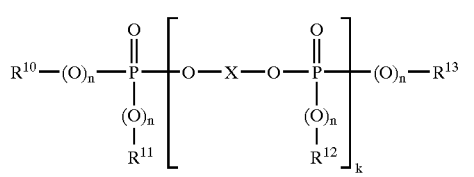

(VII)

In the formula, $R^{10}$, $R^{11}$, $R^{12}$ and $R_{13}$, independently, each represent optionally halogenated $C_1$–$C_8$ alky, $C_5$–$C_6$ cycloalkyl, $C_6$–$C_{20}$ aryl or $C_7$–$C_{12}$ aralkyl groups.

$R^{10}$, $R^{11}$, $R^{12}$ and $R^{13}$, independently, preferably represent $C_1$–$C_4$ alkyl, phenyl, naphthyl or phenyl-$C_1$–$C_4$-alkyl groups. Aromatic groups $R^{10}$, $R^{11}$, $R^{12}$ and $R^{13}$ may for their part be substituted with halogen atoms and/or alkyl groups, preferably chlorine, bromine and/or $C_1$–$C_4$ alkyl groups. Particularly preferred aryl groups are cresyl, phenyl, xylenyl, propylphenyl or butylphenyl and also the corresponding brominated and chlorinated derivatives thereof.

X in formula (VII) represents a mononuclear or polynuclear aromatic group with 6 to 30 carbon atoms. This is preferably derived from diphenols of the formula (II). Diphenylphenol, bisphenol A, resorcinol or hydroquinone or their chlorinated or brominated derivatives are particularly preferred.

n in formula (VII) may, independently, be 0 or 1; n is preferably equal to 1.

k has a value from 0 to 30 and preferably has an average value from 0.3 to 20, in particular 0.5 to 10, specifically 0.5 to 6.

Mixtures of 10 to 90 wt. %, preferably 12 to 40 wt. %, of at least one monophosphorus compound of the formula (VI) and at least one oligomeric. phosphorus compound, for example a mixture of oligomeric phosphorus compounds such as those described in EP-A-363 608 and phosphorus compounds in accordance with formula (VII) in amounts of 10 to 90 wt. %, preferably 60 to 88 wt. %, with respect to the total amount of phosphorus compounds, may also be used.

Monophosphorus compounds of the formula (VI) are in particular tributyl phosphate, tris-(2-chloroethyl) phosphate, tris-2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, dimethyl methylphosphonate, diphenyl methylphosphonate and diethyl phenylphosphonate, triphenylphosphine oxide or tricresylphosphine oxide.

The mixtures of monomeric and oligomeric phosphorus compounds of the formula (VII) have average k values of 0.3 to 20, preferably 0.5 to 10, in particular 0.5 to 6.

The phosphorus compounds mentioned are known (e.g. EP-A-363 608, EP-A-640 655) or can be prepared in a similar manner by known methods (e.g. Ullmanns Encyclopädie der technischen Chemie, vol. 18, p. 301 et seq., 1979; Houben-Weyl, Methoden der organischen Chemie, vol. 12/1, p. 43; Beilstein vol. 6, p. 177).

Moulding compositions according to the invention containing components A to E and optionally further known additives such as stabilisers, colorants, pigments, lubricants and mould release agents, nucleating agents and antistatic agents, are prepared by mixing the relevant constituents in a known manner and melt compounding and melt extruding at temperatures of 200° C. to 300° C. in conventional equipment such as internal compounders, extruders and twin-shaft screws, wherein component E is preferably used in the form of the coagulated mixture mentioned above.

Mixing the individual constituents may take place in a known manner either in sequence or simultaneously, in fact either at about 20° C. (room temperature) or at a higher temperature.

Due to their exceptional flame resistance and good mechanical properties, thermoplastic blends according to the invention are suitable for producing moulded articles of any type, in particular those with high demands relating to resistance to breaking.

Moulding compositions according to the present invention may be used to produce moulded articles of any type. In particular, moulded articles may be produced by injection moulding. Examples of moulded articles which can be produced are: housing sections of any type, e.g. for domestic equipment such as juice presses, coffee machines, mixers, for office machines such as monitors, printers, copiers or cladding for the construction sector and parts for the car sector. They can also be used in the electrical engineering area because they have very good electrical properties.

Furthermore, moulding compositions according to the invention may be used, for example, to produce the following moulded articles or moulded parts:

Internal structural parts for rail vehicles (FR), hub caps, housings for small transformers containing electrical equipment, housings for equipment for information distribution and transmission, housings and covers for medical purposes, massage equipment and housings therefor, toy vehicles for children, flat wall panels, housings for safety devices, rear spoilers, thermally insulated ansport containers, devices for housing or caring for small animals, moulded parts for sanitary and bath fittings, cover grids for ventilation openings, moulded parts for summerhouses and garden sheds, housings for garden equipment.

Another form of processing is the production of moulded articles by thermoforming from previously produced sheets or films.

Therefore, the present invention also provides use of moulding compositions according to the invention to produce moulded articles of any type, preferably the articles mentioned above, and the moulded articles made from moulding compositions according to the invention.

EXAMPLE

Component A

Linear polycarbonate based on bisphenol A with a relative solution viscosity of 1.252 measured in $CH_2Cl_2$ as solvent at 25° C. and at a concentration of 0.5 g/100 ml.

Component B

Graft Substrate:

B.2 An emulsion of a partially cross-linked polybutadiene with a mean particle diameter of 0.28 μm ($d_{50}$ value) and a gel content of 55 wt. %. The emulsion contains 50 wL% of polymeric solids.

Preparing the Graft Polymer:

Ba) A graft polymer consisting of 60 wt. % of a diene rubber (B.2) and 40 wt. % of a SAN copolymer in accordance with DE-A 37 08 913.

A mixture of 200 parts by wt. of latex (B.2) and 149 parts by wt. of water are initially introduced into a reactor and heated to 60 to 62° C. At this temperature, the following two solutions or emulsions are introduced into the reactor in the following sequence:

1. 0.0836 parts by wt. of cumyl hydroperoxide
   6.9600 parts by wt. of water
   0.0600 parts by wt. of the Na salt of $C_{14}$–$C_{16}$ alkyl-sulfonic acids
2. 0.0557 parts by wt. of ascorbic acid
   6.9600 parts by wt. of water Then, the following feed streams are supplied to the reactor, with stirring, over the course of 4 hours and with an internal temperature of 60 to 62° C.:

Z1) 39.05 parts by wt. of water
   4.00 parts by wt. of the Na salt of disproportionated abietic acid
   3.10 parts by wt. of 1N caustic soda solution
   0.62 parts by wt. of cumyl hydroperoxide Z2) 59 parts by wt. of styrene
   23 parts by wt. of acrylonitrile Z3) 39.800 parts by wt. of water
   00.105 parts by wt. of ascorbic acid The mixture is then polymerised at 60 to 62° C. for a further 6 hours. The monomer conversion is greater than 97 wt. %.

After stabilising with 1.2 parts by wt. of phenolic antioxidant, per 100 parts by wt. of graft polymer, the graft polymer is isolated by coagulating with an acetic acid/Mg sulfate mixture, washed and dried to form a powder.

SAN grafting proceeded with a graft yield of 89 wt. %.

The graft yield was determined by fractionating de-mixing with the de-mixing liquids dimethylformamide/methylcyclohexane in an ultracentrifuge and by determining the amounts and chemical composition of the fractions obtained in this way (see R. Kuhn, Makromol-Chemie 177, 1525 (1976)).

Component C

Styrene/acrylonitrile copolymer with a styrenelacrylonitrile ratio by weight of 72:28 and an intrinsic viscosity of 0.55 dl/g (measured in dimethylformamide at 20° C.).

Component D

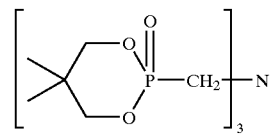

(XPM 1000 development product from Solutia Inc., St. Louis, USA).

Component E

Tetrafluoroethylene polymer as a coagulated mixture of an SAN graft polymer emulsion in accordance with component B described above in water and a tetrafluoroethylene polymer emulsion in water. The ratio by weight of graft polymer B to tetrafluoroethylene polymer E in the mixture is 90 wt. % to 10 wt. %. The tetrafluoroethylene polymer emulsion has a solids content of 60 wt. %, the mean particle diameter is between 0.05 and 0.5 μm. The SAN graft polymer emulsion has a solids content of 34 wt. % and an average latex particle diameter of $d_{50}$=0.28 μm.

Preparing E

The emulsion of tetrafluoroethylene polymer (Teflon 30 N from DuPont) is mixed with the emulsion of SAN graft polymer B and stabilised with 1.8 wt. %, with respect to polymeric solids, of phenolic antioxidant. The mixture is coagulated at 85 to 95° C. using an aqueous mixture of $MgSO_4$ (Epsom salts) and acetic acid at a pH of 4 to 5, filtered and washed until virtually free of electrolytes. Then, the major proportion of water is removed by centrifuging and the residue to dried at 100° C. to produce a powder. This powder can then be compounded with the other components in the equipment described.

Preparing and Testing Moulding Compositions According to the Invention

The components were mixed in a 3 l internal compounder. The moulded articles were prepared at 260° C. on an injection moulding machine of the Arburg 270 E type.

The heat resistance according to Vicat B was determined in accordance with DIN 53 460 (ISO 306) using rods with the dimensions 80×10×4 mm.

The weld line strength ($a_n$) was determined by measuring the impact resistance according to DIN 53 453 at the weld line on both sides of an injection moulded specimen (processing temperature 260° C.) with the dimensions 170× 10×4 mm.

The stress crack behaviour (ESC behaviour) was investigated using rods with the dimensions 80×10×4 mm, processing temperature 260° C. A mixture of 60 vol. % toluene and 40 vol. % isopropanol was used as the test medium. The specimens were pre-stretched using an arc-shaped jig (pre-stretching as a percentage) and stored at room temperature in the test medium. The stress crack behaviour is assessed by the production of cracks or a fracture, as a function of the pre-stretching in the test medium.

The fire behaviour of the samples was measured in accordance with UL-Subj. 94 V on rods with the dimensions 127×12.7×1.6 mm, produced on an injection moulding machine at 260° C.

The UL 94 V test is performed as follows:

Samples of the substance are moulded to give rods with the dimensions 127×12.7×1.6 mm. The rods are mounted vertically so that the lower face of the specimen is located 305 mm above a strip of dressing material. Each test rod is ignited individually by means of two sequential ignition processes which last for 10 s, the burning characteristics are observed after each ignition process and then the samples are assessed. To ignite the samples, a Bunsen burner with a 100 mm (3.8 inch) high blue flame of natural gas with a thermal content of $3.73 \times 10^4$ kJ/m$^3$ (1000 BTU per cubic foot) is used.

UL 94 V-O classification covers the properties of the material described below, which are tested in accordance with the UL 94 V instructions. The moulding compositions in this class do not contain any samples which burn for longer than 10 s after each application of the test flame; they exhibit total flame times of not more than 50 s during the two applications of a flame to each set of samples; they do not contain any samples which bun completely up to the retaining clip fastened to the upper end of the sample; they do not include any samples which ignite the wadding arranged below the sample as a result of burning droplets or particles; also, they do not contain any samples which glow for longer than 30 s after removing the test flame.

Other UL 94 classifications are allocated to samples which are less flame resistant or less self-extinguishing, because they give off flaming droplets or particles. These classifications are called UL 94 V-1 and V-2. NJ3. means "non resistant" and relates to the classification of samples which have a post-burning time of $\geq 30$ s.

The composition and properties are summarised in the table given below.

TABLE

Moulding compositions and their properties

| Example | 1 |
|---|---|
| Components (parts by wt.) | |
| A | 68.4 |
| Ba | 6.8 |
| C | 9.3 |
| D | 10.8 |
| E | 4.2 |
| Properties | |
| $a_k$ (ISO 180/1A) [kJ/m$^2$] | 43.5 |
| Vicat B 120 [° C.] | 116 |
| UL 94 V 3.2 mm | V-O |
| $a_n$ weld strength [kJ/m$^2$] | 4.9 |
| ESC bebaviour | 2.0 |
| Fracture at $\epsilon_x$ [%] | |

When using the special graft polymer, prepared by means of a redox initiator system, in polycarbonate moulding compositions, good mechanical properties are exhibited in the presence of phosphonate amine as a flame retardant. Good values for notched impact resistance ($a_k$), weld line strength and adequate stress crack resistance arc prerequisites for use in thin-walled housing parts.

What is claimed is:

1. Blends containing
  A) 40 to 99 parts by wt. of aromatic polycarbonate and/or polyestercarbonate,
  B) 0.5 to 60 parts by wt. of a graft polymer, characterised in that the graft polymers B consist of
  B.1) 5 to 95 wt. % of one or more vinyl monomers and
  B.2) 95 to 5 wt. % of one or more particulate diene rubbers with a glass transition temperature of <10° C., which are prepared by emulsion polymensation,
    wherein an initiator system consisting of an organic hydroperoxide and ascorbic acid is used for graft polymerisation.
  C) 0 to 45 parts by wt. of at least one thermoplastic polymer, selected from the group consisting of thermoplastic vinyl (co)polymers and polyalkylene terephthalates and
  D) 0.1 to 30 parts by wt. of a phosphonate amine of the general formula (I)

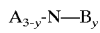

in which
   A represents a group of the formula (IIa)

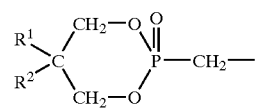

or (IIb)

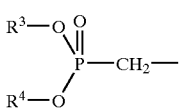

R$^1$ and R$^2$, independently, represent an unsubstituted or substituted C$_1$–C$_{10}$ alkyl group or an unsubstituted or substituted C$_6$–C$_{10}$ aryl group,
   R$^1$ and R$^4$, independently, represent an unsubstituted or substituted C$_1$–C$_{10}$ alkyl group or an unsubstituted or substituted C$_6$–C$_{10}$ aryl group or
   R$^3$ and R$^4$ together represent an unsubstituted or substituted C$_3$–C$_{10}$ alkylene group,
   y has the numerical value 0, 1 or 2 and
   B independently, represents hydrogen, an optionally halogenated C$_2$–C$_8$ alkyl group, an unsubstituted or substituted C$_6$–C$_{10}$ aryl group,
  E) 0 to 5 parts by wt. of a fluorinated polyolefin
   wherein the sum of the parts by wt. of all the blend components is 100.

2. Blends in accordance with claim 1, containing
  60 to 98.5 parts by wt. of A,
  1 to 40 parts by wt. of B,
  0 to 30 parts by wt. of C,
  2 to 25 parts by wt. of D, and
  0.1 to 3 parts by wt. of E.

3. Blends according to claim 1 containing 2 to 25 parts by wt. of C.

4. Blends according to claim 1 containing 5 to 20 parts by wt. of D.

5. Blends according to claim 1 wherein vinyl monomers B.1 are mixtures of
  B.1.1 50 to 99 parts by wt. of vinyl aromatic compounds and/or ring-substituted vinyl aromatic compounds and/or C$_1$–C$_8$ alkyl (meth)acrylates and
  B.1.2 1 to 50 parts by wt. of vinyl cyanides and/or C$_1$–C$_8$ alkyl (meth)acrylates and/or derivatives of unsaturated carboxylic acids.

6. Blends according to claim 1 wherein diene rubber is selected from the group consisting of diene rubbers, mixtures of diene rubbers, copolymers of diene rubbers and mixtures of diene rubber with further copolymerisable monomers.

7. Blends according claim 1 wherein the diene rubber is a polybutadiene rubber.

8. Blends according to claim 1 wherein the graft yield during polymerisation is >60 wt. %.

9. Blends according to claim 1 wherein the graft yield is >75 wt. %.

10. Blends according to claim 1 wherein the graft yield is >85 wt. %.

11. Blends according to claim 1 wherein cumyl hydroperoxide, tert.-butyl hydroperoxide and/or hydrogen peroxide are used as hydroperoxides.

12. Blends according to claim 1 wherein D is selected from the group consisting of 5,5,5',5',5",5"-hexamethyl-tris-(1,3,2-dioxaphosphorinane-methane)-amino-2,2',2"-trioxide,1,3,2-dioxaphosphorinane-2-methanamine, N-butyl-N[(5,5-dimethyl-1,3,2-dioxaphosphorinan-2-yl)-methyl]-5,5-dimethyl-, P,2-dioxide; 1,3,2-dioxaphosphorinane-2-methanamine, N-[(5,5-dimethyl-1,3,2-dioxaphos-phorinan-2-yl)-methyl]-5,5dimethyl-N-phenyl-P,2-dioxide; 1,3,2-dioxaphosphorinane-2-methanamine, N,N-dibutyl-5,5-dimethyl-, 2-oxide, 1,3,2-dioxaphosphorinane-2-methanamine, N-[(5,5-dimethyl-1,3,2-dioxaphosphorinan-2-yl)-methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)-methyl]-5,5-di-chloromethyl-, P,2-dioxide, 1,3,2-dioxa-phosphorinane-2-methanamine, N-[(5,5-di-chloromethyl-1,3,2-dioxa-phosphorinan-2-yl)-methyl]-5,5-di-chloromethyl-N-phenyl-, P,2-dioxide; 1,3,2-dioxaphosphorinane-2-methanamine, N,N-di-(4-chlorobutyl)-5,5-di-methyl-2-oxide; 1,3,2-dioxaphosphorinane-2-methanamine, and N-[(5,5-dimethyl-1,3,2-dioxaphosphorinan-2-yl)-methane]-N-(2-chloroethyl)-5,5-di-(chloromethyl)-, P2-dioxide.

13. Blends according to claim 1 containing at least one additive selected from the group consisting of lubricants and mould release agents, nucleating agents, antistatic agents, stabilisers, colorants and pigments.

14. Blends according to claim 1 containing further flame retardants which are different from component D.

15. A process for preparing moulding compositions in according with claim 1, wherein the components A to B and optionally further additives are mixed and melt compounded.

16. A thermoplastic molding composition comprising
A) 40 to 99 parts by wt. of a member selected from the group consisting of aromatic polycarbonate and polyestercarbonate,
B) 0.5 to 60 parts by wt. of a graft polymer that contains
B.1) 5 to 95% relative to the weight of the graft polymer of one or more vinyl monomers and
B.2) 95 to 5% relative to the weight of the graft polymer of one or more particulate diene rubber substrate having a glass transition temperature of <10° C., the diene rubber being the product of emulsion polymerization wherein initiator system included an organic hydroperoxide and ascorbic acid,
C) 0 to 45 parts by wt. of at least one thermoplastic polymer, selected from the group consisting of thermoplastic vinyl (co)polymers and polyalkylene terephthalates and
D) 0.1 to 30 parts by wt. of a phosphonate amine of the formula (I)

$$A_{3-y}\text{-N}-B_y \qquad (I),$$

in which

A represents a group of the formula (IIa)

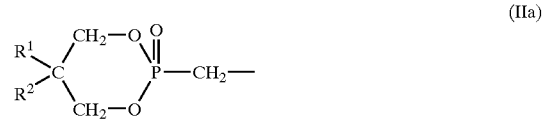

(IIa)

or (IIb)

(IIb)

$R^1$ and $R^2$, independently, represent an unsubstituted or substituted $C_1$–$C_{10}$ alkyl group or an unsubstituted or substituted $C_8$–$C_{10}$ aryl group, $R^3$ and $R^4$, independently, represent an unsubstituted or substituted $C_1$–$C_{10}$ alkyl group or an unsubstituted or substituted $C_6$–$C_{10}$ aryl group or $R^3$ and $R^4$ together represent an unsubstituted or substituted $C_3$–$C_{10}$ alkylene group, y is 0, 1 or 2 and B independently, represents hydrogen, an optionally halogenated $C_2$–$C_8$ alkyl group, an unsubstituted or substituted $C_6$–$C_{10}$ aryl group, and E) 0 to 5 parts by wt. of a fluorinated polyolefin the sum of the parts by wt. of A), B), C), D), and E) is 100.

17. The composition of claim 16 wherein A is present in an amount of 60 to 98.5 parts by wt., B is present in an amount of 1 to 40 parts by wt., C is present in an amount of 0 to 30 parts by wt., D is present in an amount of 2 to 25 parts by wt., and E is present in an amount of 0.1 to 3 parts by wt.

18. The composition of claim 16 wherein B.1 is a mixture of
B.1.1 50 to 99 parts by wt. of at least one member selected from the group consisting of vinyl aromatic compound, ring-substituted vinyl aromatic compound and $C_1$–$C_8$ alkyl methacrylate and
B.1.2 1 to 50 parts by wt. of at least one member selected from the group consisting of vinyl cyanide, $C_1$–$C_8$ alkyl (meth)acrylate and derivative of unsaturated carboxylic acid,
wherein the total of B.1.1 and B.1.2 being 100 parts by weight.

19. The composition of claim 16 wherein the substrate is polybutadiene rubber.

20. The composition of claim 16 wherein hydroperoxide is a member selected from the group consisting of cumyl hydroperoxide, tert.-butyl hydroperoxide and hydrogen peroxide.

21. A molded article comprising the composition of claim 16.

* * * * *